United States Patent [19]
Chen

[11] Patent Number: 5,671,487
[45] Date of Patent: Sep. 30, 1997

[54] PORTABLE MOBILE TOILET

[76] Inventor: Jen-Yue Chen, P.O. Box 90, Tainan 704, Taiwan

[21] Appl. No.: 633,369

[22] Filed: Apr. 16, 1996

[51] Int. Cl.⁶ .................................................. A47K 11/04
[52] U.S. Cl. ............................ 4/477; 4/476; 4/449
[58] Field of Search .......................... 4/449, 460, 476, 4/477, 479, 482, 483, 484

[56]  References Cited

U.S. PATENT DOCUMENTS

| | | | |
|---|---|---|---|
| 4,744,111 | 5/1988 | Tegg et al. | 4/460 |
| 4,831,671 | 5/1989 | Harding | 4/460 |
| 4,922,557 | 5/1990 | Harding et al. | 4/477 |

*Primary Examiner*—David J. Walczak
*Attorney, Agent, or Firm*—Bacon & Thomas

[57] ABSTRACT

A portable and mobile toilet includes a case for removably placing a bowl therein, and four elongate walls and an upper cover collapsibly combined together. The case, the bowl and the upper cover have an outer layer and an inner layer to form an inner hollow cavity for a gas to fill therein when the toilet is to be combined together for use. The upper cover is placed on the four walls when in use, and is closed on the case when collapsed. The four walls are made of a flexible opaque material, able to be rolled up and stored in the case when collapsed. Ropes and nails are provided to secure the upper cover and the case stably to keep the toilet secured on the ground.

4 Claims, 5 Drawing Sheets

5,671,487

PORTABLE MOBILE TOILET

BACKGROUND OF THE INVENTION

This invention concerns a collapsible portable and mobile toilet, particularly one inflated with a gas.

Nowadays living standard of peoples in the world have been growing higher and higher, and leisure activities such as picnics, camping, hiking, tours, etc., are made much of. Often toilets are not found in remote mountain areas. And one has to find a place not easily seen for relieving nature, which is very inconvenient. But so far a portable and mobile toilet has not been available in market.

SUMMARY OF THE INVENTION

The object of the invention is to offer a collapsible portable and mobile toilet, that is easily carried.

The main feature of the invention is a case, a bowl removably placed in the case, four elongate walls for hiding a person using this toilet, and an upper cover to be closed on the elongate walls.

The case has an outer layer made of a hard material and an inner layer made of a soft material, and a air passageway formed between the outer and the inner layer for gas exhausted out of a car to fill therein.

The four walls are formed of a soft flexible, opaque material, respectively having a lower end adhered on an upper end of the case by a heating process, having air apertures in the adhered lower end for air to flow in and out. Every two neighboring walls have a zipper and are connected together with the zipper when the toilet is to be used. A front elongate wall is provided with a door, which can be closed by means of hook and loop fastener tapes, etc. The four walls can be rolled and stored in the case when collapsed.

The bowl is removably placed in the case, having a cavity for placing a waste bag, a liftable cover able to be closed on an upper side of the bowl, and an outer layer and an inner layer forming a hollow air passageway as the case and a plurality of air holes in an upper side end.

After the four walls and the upper cover are inflated and combined together, ropes are tied between position ears of the case and of the upper cover and nails fixed in the ground to keep the toilet combined for use in a stable condition.

In addition, an extraction fan is provided in the center of the upper cover and a suction fan is provided in a rear vertical side of the case for ventilating the air inside the toilet to prevent the inside of the toilet from becoming stained with bad odor.

BRIEF DESCRIPTION OF DRAWINGS

This invention will be better understood by reference to the accompanying drawings, wherein.

DESCRIPTION OF THE PREFERRED EMBODIMENT

Figure 1:
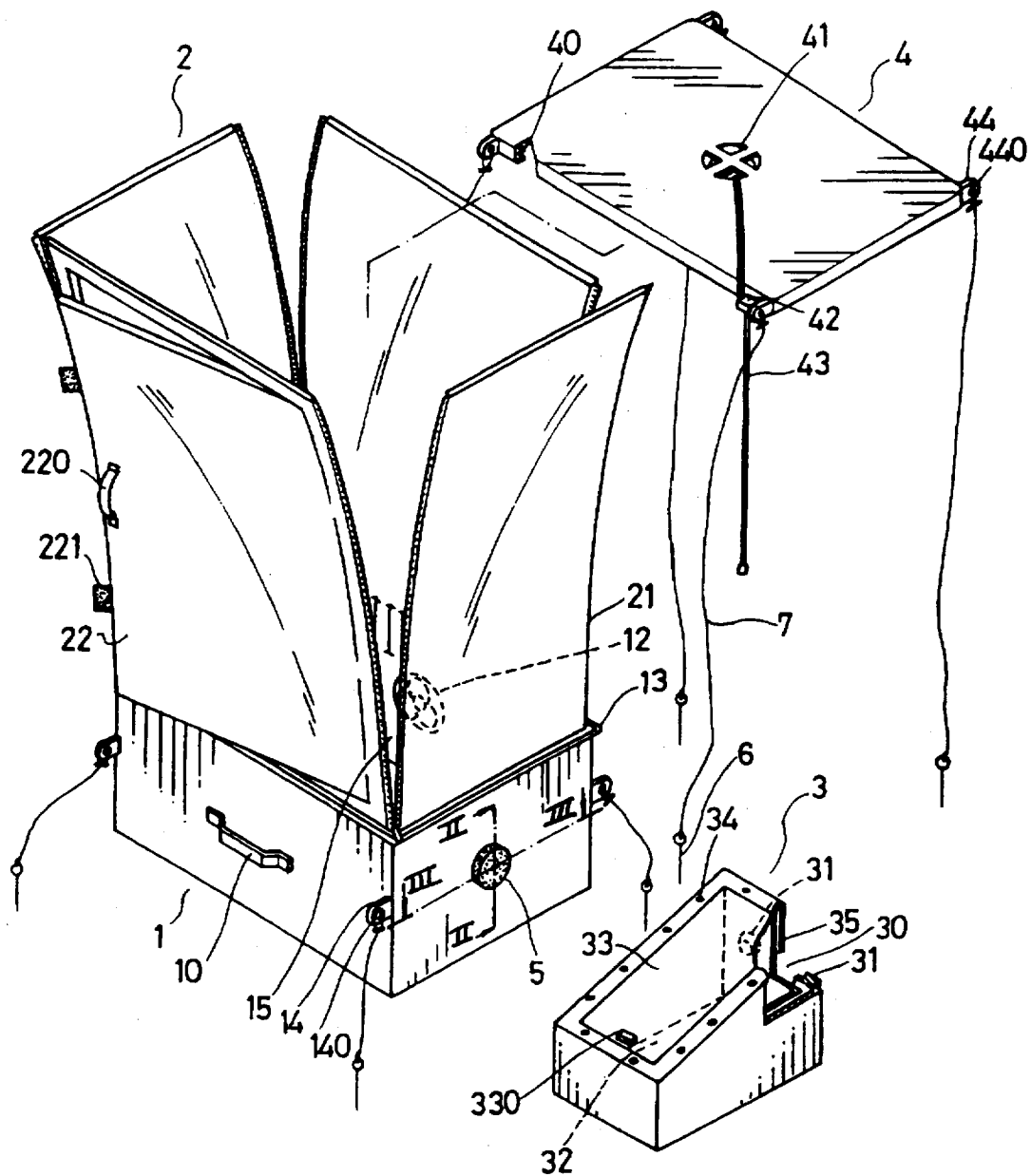
FIG. 1 is an exploded perspective view of a portable mobile toilet in the present invention.
Figure 2:
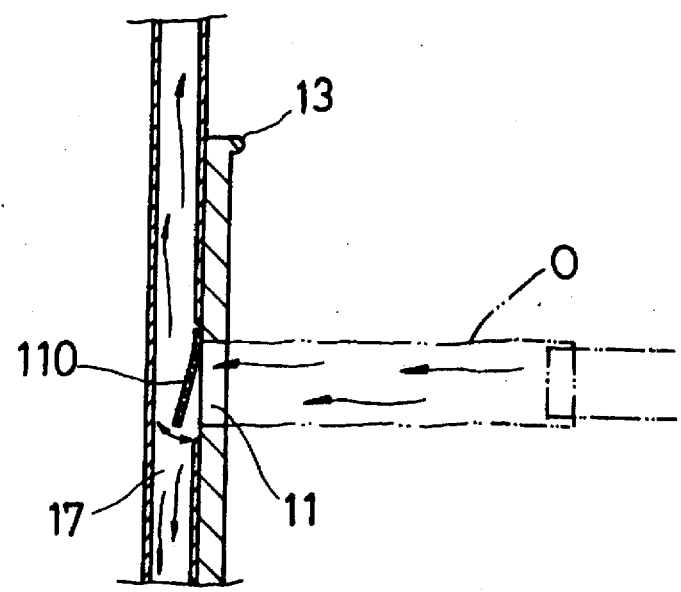
FIG. 2 is a cross-sectional view of line A–A' in FIG. 1.
Figure 3:
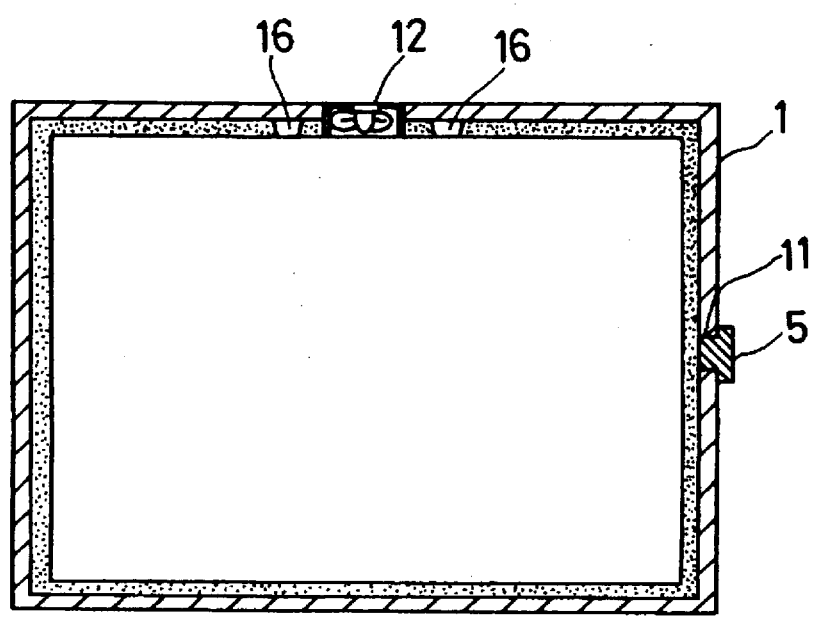
FIG. 3 is a cross-sectional view of line B–B' in FIG. 1.

A preferred embodiment of a portable and mobile toilet in the present invention, as shown in FIGS. 1, 2 and 3, includes a case 1, four elongate walls 2, a bowl 3, an upper cover 4, a stopper 5, nails 6 and ropes 7 collapsibly combined together.

The case 1 has an open upper side, a closed lower side, four vertical sides formed of an outer layer made of a hard material and an inner layer made of a soft material, a grip 10 fixed on an outer surface of a front side, an air hole 11 provided through the outer layer of a right vertical side, a flap 110 fitted on an inner side of the air hole 11 to open or close the air hole 11, a suction fan 12 fixed in a rear side, a flange 13 on an upper end and a position ear 14 with a hole 140 below each projection 13. The case 1 further has an inner cavity 15 formed with the four sides and the lower side. The inner layer of the rear side has two holes 16, as shown in FIG. 3, and an air passageway 17 is formed between the outer and the inner layers of the four vertical sides, as shown in FIG. 2.

Figure 5:
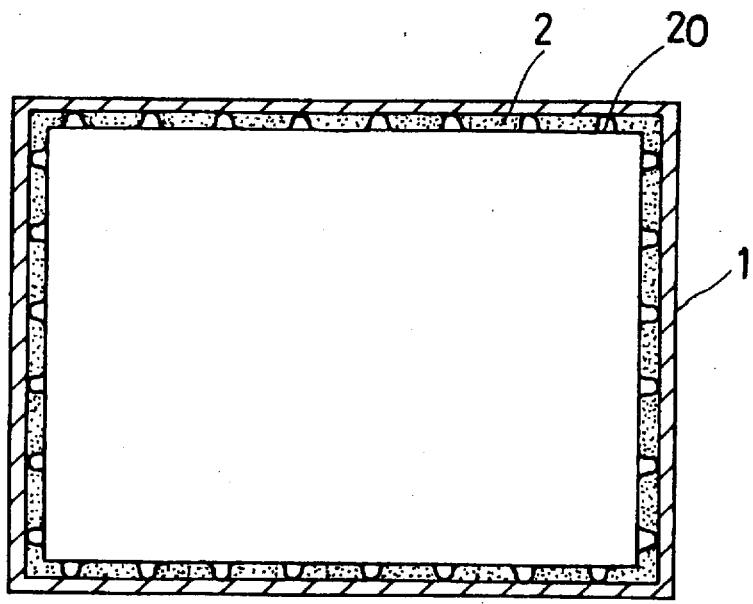
FIG. 5 is a cross-sectional view of line C–C' in FIG. 4.

The four elongate walls 2 are respectively formed integral and made of a soft, flexible and opaque material, with its lower end adhered on an upper end of the case 1 by a heating process wherein each wall has a plurality of air apertures 20 spaced apart in the adhered lower end for air to flow in and out, as shown in FIG. 5. Every two neighboring walls 2, 2 are provided with a zipper 21 along their vertical side ends so that the elongate walls can be combined together to form an inner room for a user to get in and be hidden thereby. Further, A door 22 is provided in the front wall 2, adhered with the front outer walls 2 by a heating process, having a grip 220 fixed near a vertical side edge, and hook and loop fastener tapes 221 on an inner side for closing the door temporarily for using the toilet.

The bowl 3 is removably placed in the inner cavity 15 of the case 1, and has two projections 31, 31 on a rear side to fit in the two holes 16 of the case 1, an air hole 30 in the rear side to face to the suction fan 12 of the case 1, an inner cavity 32, a liftable cover 33 with a pull block 330 on a lower point of an upper surface to close and open the cavity 32, plural air holes 34 spaced apart on an upper surface, and an air passageway 35 formed in four vertical side walls as the air passageway 17 in the case 1.

The upper cover 4 is shaped to cover an upper side of the outer walls 2, and has a flange 40 to correspond to the flange 13 of the case 1, an extraction fan 41 fixed in the center, a switch 42 at one side, a pull rope 43 connected with the switch 42 for turning on and off the switch 42, and a position ear 44 with a hole 440 fixed respectively at four corners.

The stopper 5 is fitted in the air hole 11 to prevent the gas filled in the air passageway 17 from flowing out.

The nails 6 are to be bound with one end of each rope 7, fixed in the ground for securing the upper cover 4 and the case 1, and thereby the whole toilet on the ground stably together with the ropes 7.

The ropes 7 respectively have one end bound on each of the position ears 14 and 44, and the other end bound on each nail 6 so as to secure the upper cover 4 and the case 1 stably, and thereby the whole toilet on the ground stably.

Figure 6:
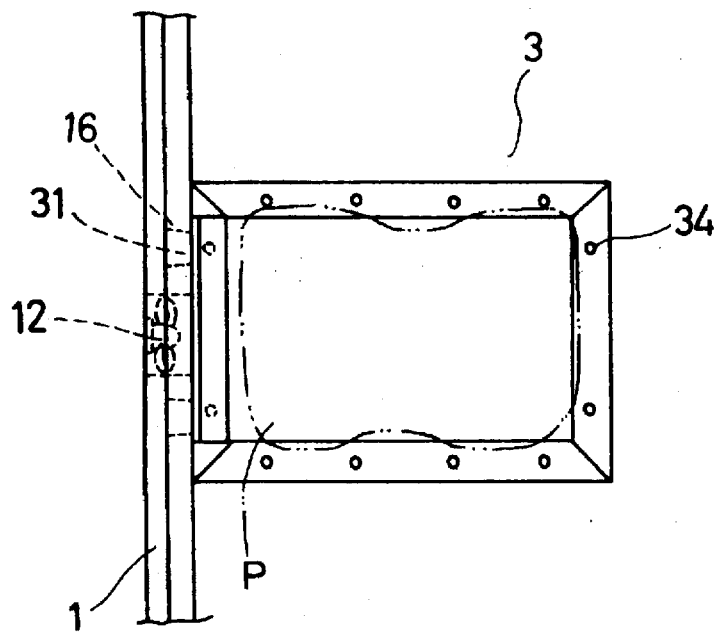
FIG. 6 is an upper view of a bowl and a case combined together in the present invention.
Figure 7:
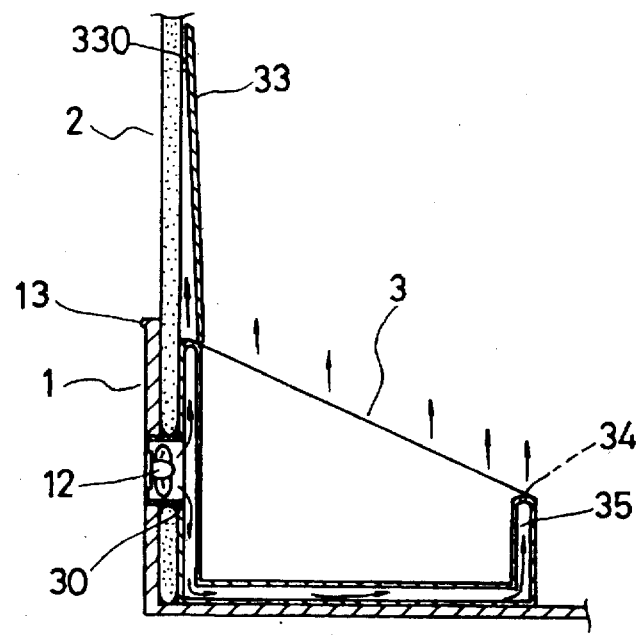
FIG. 7 is a cross-sectional view of the case in the present invention, showing how the air therein flows out; and, FIG. 8 is a perspective view of the portable and mobile toilet collapsed in the present invention.
Figure 8:
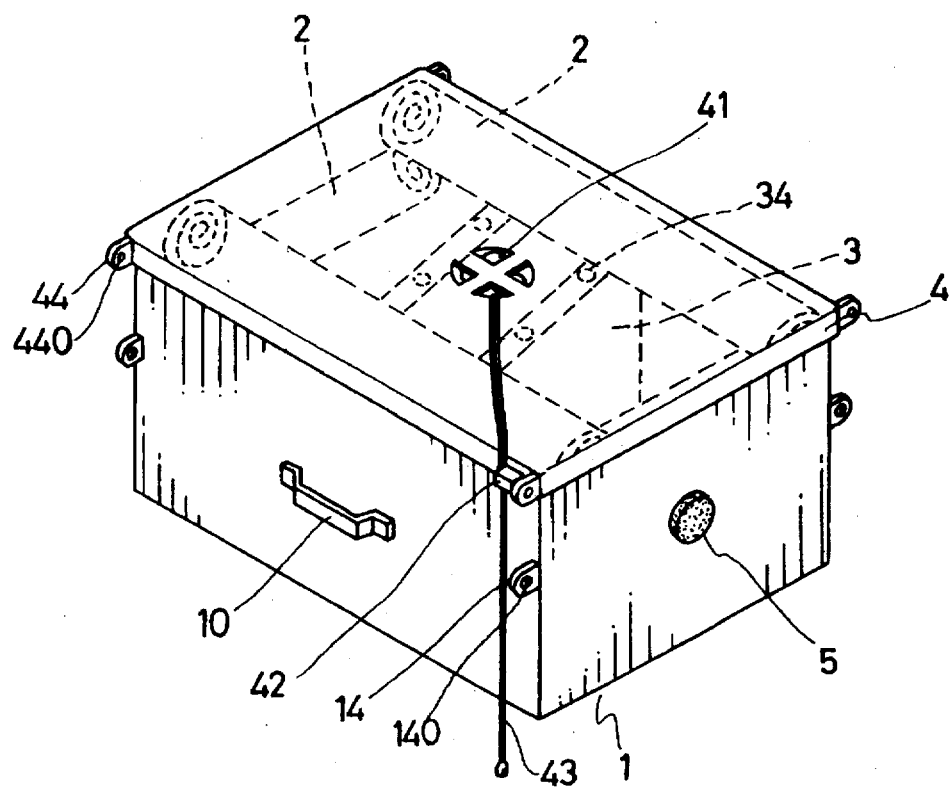

In assembling, referring to FIG. 2, firstly a tube 0 is connected between the air hole 11 of the case 1 and the exhaust tube of a car, filling the air passageway of the case 1 with gas exhausted out of the car. Next, the bowl 3 is placed in the inner cavity 15 of the case 1, with the projections 31, 31 fitted in the holes 16, 16 of the case 1, and with the air hole 30 of the bowl 3 just facing to the suction fan 12, as shown in FIG. 6. Then gas from the car is made to increase so that the gas may flow through the air passageway 17 and through the air apertures 20 of the four elongate walls 2 so as to inflate the elongate walls 2. Then the zippers 21 are pulled up to the top of the elongate walls 2. After the four walls 2 are inflated, enough, the tube 0 is to be taken off the air hole 11. Then the flap 110 closes up tightly the air hole 11 from inside so that the air in the passageway 17 never flow out, with the stopper 5 inserted in the air hole 11. After that, a waste bag P is placed in the inner cavity 32 of the bowl 3, and the upper cover 4 is closed on top of the four walls 2, with the ropes 7 bound with the position ears 14 and 44 and then bound with the nails 6 fixed tightly in the ground, finishing assembling this toilet as shown in FIG. 4.

Figure 4:
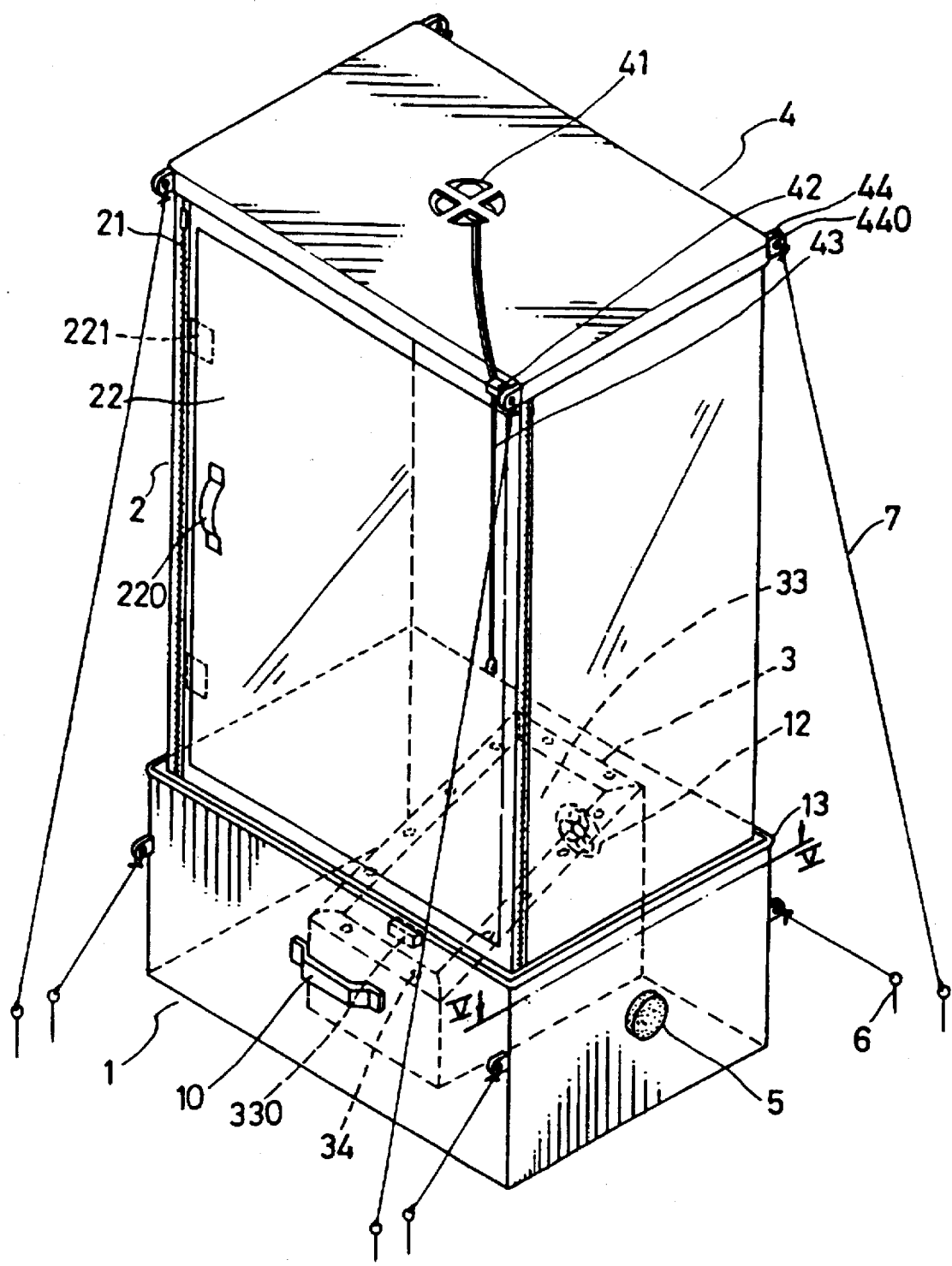
FIG. 4 is a perspective view of the portable mobile toilet in the present invention.

In using, referring to FIG. 4, a user pulls the pull string 43 to turn on the switch 42, permitting the suction fan 12 and the extraction fan 41 to rotate, then the user opens the door 22, enters the room surrounded by the four walls 2, and hooks the hook and loop fastener tapes to close the door 22. Then the user lifts up the liftable cover 33, and uses the bowl 3 with a waste bag P spread in the inner cavity 32. The suction fan 12 can suck in fresh air so that the user may not smell bad odor. And fresh air flows through the air hole 30 into the air passageway 35 of the bowl 3, out of the air holes 34 and finally exhausted out by the extraction fan 41.

After the user finishes using the toilet, the waste bag P is to be wrapped up and thrown in a trash can. Provided the bowl 3 should be stained, it might be taken off the case 1 for washing.

If the portable and mobile toilet is to be collapsed for carrying, the stopper 5 is taken off the air hole 11, and the flap 110 is pushed inward to let the air inside the passageway 17 to flow out of the air hole 11. Then the upper cover 4 is removed off the four walls 2, and the zippers 21 are pulled down, permitting the walls 2 bend down outward and then to be rolled up and stored in the cavity 15 of the case 1. Finally, the upper cover 4 is closed up on the case 1, with the flange 40 of the upper cover 4 being made to engage the flange 13 of the case 1. Then the toilet is collapsed and can be carried with the grip 10 being held manually.

The portable and mobile toilet in the invention is deemed to have advantages as follows.

1. It is easy to use, and convenient to carry.

2. It can be inflated by gas exhausted cut of a car, needless to carry an air pump.

3. It can be spread out to be position on the ground anywhere, and collapsed, unlimited by the lay of a land.

4. The bowl can be taken out of the case for washing, if it is stained, easy to keep it clean.

5. It has a good ventilation, prevented from bad odor to be smelled by a user.

While the preferred embodiment of the invention has been described above, it will be recognized and unerstood that various modifications may be made therein and the appended claims are intended to cover all such modifications which may fall within the spirit and scope of the invention.

What is claimed is:

1. A portable and mobile toilet located on ground, comprising:

a case having an open upper side, a closed lower side and four vertical sides forming four corners, said lower side and said four vertical sides each having an outer layer and an inner layer, a grip fixed on a vertical side, an air hole provided in said outer layer of a first of said vertical sides, a movable flap provided inside of said air hole to close and open said air hole, a suction fan fixed in a second of said vertical sides, a flange provided on an upper edge of said four vertical sides, a position ear with a hole provided at each of the four corners, an inner cavity formed by said lower side and said four vertical sides, two holes provided in said second vertical side, and a first air passageway formed between said outer layer and said inner layer of said lower side and said four vertical sides;

four vertical elongate walls each having a lower end adhered to an upper end of said case, each wall made of an opaque flexible material, having a plurality of air apertures in the lower end for gas to flow in and out, a zipper provided along a vertical side edge of every two adjacent vertical walls for connecting together said every two adjacent vertical walls, a first one of said four walls having a door, a grip fixed on said door for opening and closing, and adhering tapes fixed on an inner side of said door for securing said door when closed;

a bowl removably located in said cavity of said case, the bowl having two projections in a rear side to fit in said two holes of said second side of said case to secure itself with said case, an air hole provided in said rear side facing said suction fan, an inner cavity for accommodating a waste bag therein, a liftable cover with a pull block thereon removably closing said inner cavity, a plurality of air holes in sides of the bowl, and second air passageways inside said sides thereof communicating with said air holes;

an upper cover closing an upper side of said four walls, each wall made of two layers of a flexible material forming a hollow cavity for filling a gas therein, the upper cover having an extraction fan, a switch connected to said extraction fan, a pull string fastened to said switch, and a plurality of position ears, each with a hole, provided on the upper cover;

a stopper removably closing said air hole in said case, preventing air from flowing out of said case; and, a plurality of ropes each having an upper end bound on one of said position ears on said upper cover and said case, and a lower end fixed tightly in the ground so as to stably secure said case and said upper cover after said toilet is assembled.

2. The portable and mobile toilet as claimed in claim 1, wherein said outer layer of said case is made of a hard material, and said inner layer thereof is made of a soft material.

3. The portable and mobile toilet as claimed in claim 1, wherein said adhering tapes are hook and loop fastener tapes.

4. The portable and mobile toilet as claimed in claim 1, wherein said adhering tapes are adhesive tapes.

* * * * *